April 17, 1928.
F. K. WARD
CLUTCH OPERATING DEVICE
Filed May 5, 1927
1,666,225
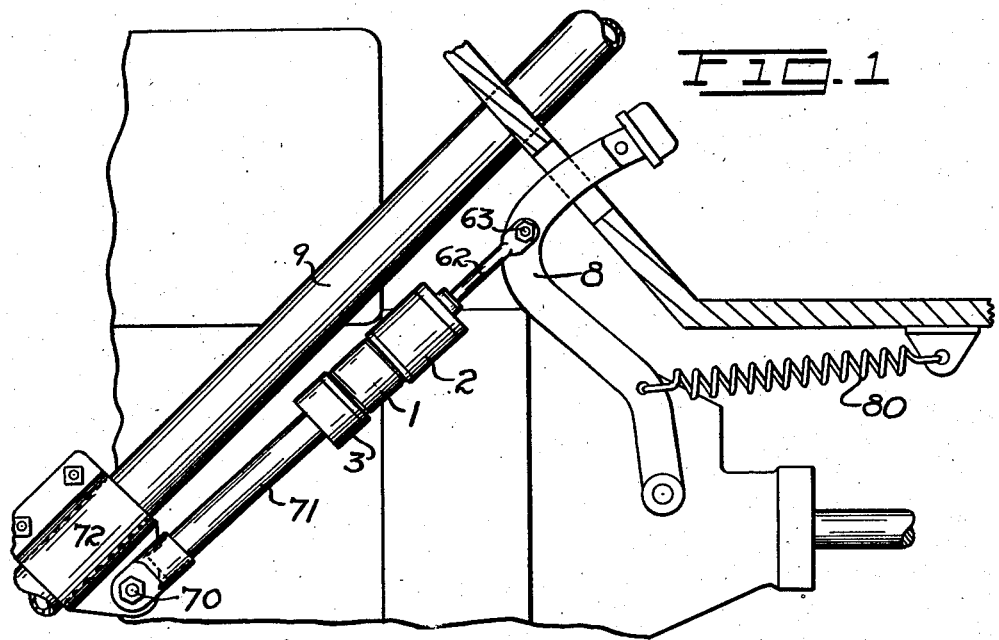
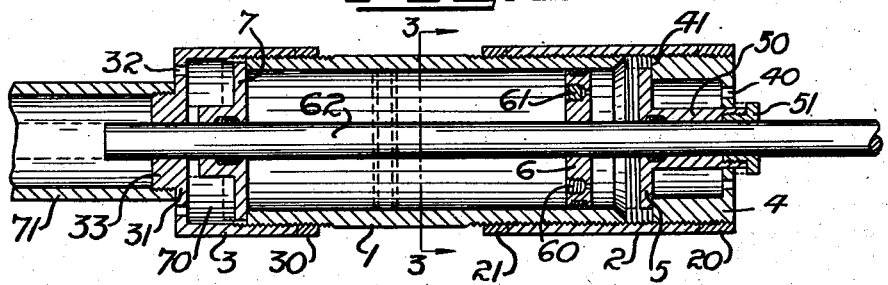
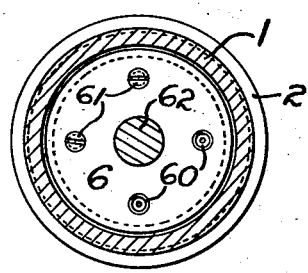
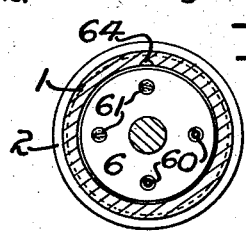
Inventor
Frederick K. Ward
By H. L. & C. L. Reynolds
Attorneys Patented Apr. 17, 1928.

1,666,225

UNITED STATES PATENT OFFICE.

FREDERICK K. WARD, OF SEATTLE, WASHINGTON.

CLUTCH-OPERATING DEVICE.

Application filed May 5, 1927. Serial No. 187,925.

My invention consists of an action-delaying device designed for application to such mechanisms as the clutch mechanisms of automobiles, to prevent too rapid an application of the clutch and the attendant evils caused thereby.

The object of my invention is to provide an automatically-acting device which will insure the gradual and easy application of clutches, substituting the uniformity of an automatic mechanism for the irregularity of human control.

My invention consists, in principle, of a dash pot, or an equivalent mechanism which may be attached to the clutch operating mechanism, and which acts to interpose no appreciable resistance to a movement to release a clutch, but which will provide sufficient resistance to the application of the clutch surfaces as to cause a regular and uniform movement, whereby sudden applications and the strains caused thereby may be eliminated.

In the accompanying drawings I have shown a preferred construction and manner of applying my invention.

Figure 1 shows my device as applied to the clutch lever of an automobile;

Figure 2 is a longitudinal section through the cylinder of my device;

Figures 3 and 4 are transverse sections through the cylinder taken substantially on the plane indicated by the line 3—3 of Figure 2; Figure 4 showing a by-pass channel not shown in Figure 3.

In the device as illustrated, a tube 1 forms the body of a cylinder in which is a movable piston 6 and a piston rod 62 which extends from both ends of the cylinder. One end of the cylinder is closed by a cup shaped head, comprising a tubular section 3 and head proper 31. The tubular flange section 3 screws over the end of the cylinder 1, and a lock ring 30 may be employed to hold it when adjusted in position. Free access of external air to the chamber 70 next to this head is provided, such as through ports 32.

Within the head 31 and outside of this end of cylinder 1, is a valve disk 7, which is slightly less in diameter than the diameter of the chamber 70, and large enough in diameter to seat upon the end of cylinder 1. The closure head 31 and the valve disk 7 are both bored for the passage of the piston rod, the valve disk 7 fitting snugly enough to provide sufficient friction to move the valve disk between its two positions.

At the opposite end of the cylinder, a sleeve 2 screws over the cylinder body 1, and has a cylinder or closure head 4 screwing therein. A locking ring or nut 20 screwing upon head 4 may be employed. Head 4 has inlet air ports 40. The disk valve 5 seats at 41 upon the inner end edge of head 4, and is limited in its unseating or inward movement by an outwardly extending sleeve 50, through which the piston rod passes, and by a cap 51 which has a flange adapted to engage the outer face of head 4.

The piston 6 has by-pass holes, as 60, therein, which, by the restriction of their area, force a slow movement of the piston when moving in the direction in which the valve disks 5 and 7 seat. When the piston moves in the opposite direction, said valve disks are unseated and there is no drag on the piston. The number of ports 60 which are effective may be varied by plugging certain thereof, as by inserting screws, as are shown at 61. As a supplementary or substitute by-pass, a groove or grooves, as 64, may be provided to extend lengthwise of and in the inner wall of the cylinder. The termination of these at a point corresponding roughly with the point of gripping of the clutch surfaces would permit quick return to near the point of effective engagement and a slow return the remainder of the way.

The cylinder 1 and the piston rod 62 are secured, one to a clutch-controlling member, as the lever 8, and the other to a fixed point. I have shown the cylinder as enclosed by a tubular extension 71 and connected by a pivot 70 to a clamp 72 secured to the casing of the steering shaft, and the piston rod as pivotally secured at 63 to the clutch lever 8. The spring 80, provided for applying the clutch members, also actuates the return of the piston 6.

By the use of such a device, expertness in handling the clutch is not necessary to prevent jerky action. The release action of the clutch is not affected, and the application of the clutch may be slowed down by this device so that the operator may release the clutch lever with any degree of suddenness without any bad results.

What I claim as my invention is:

1. A dash pot attachment for spring-applied power transmitters, comprising a pneumatic cylinder and piston, one anchored and the other connected with the spring-actuated parts, a piston rod extending in both directions from the piston and a controlling valve at each end of the cylinder movable between open and closed positions by frictional engagement with the piston rod, said valve seating to be held closed by the air under the action of the piston when moving in the direction required for applying the power.

2. A dash pot attachment for clutch levers of automobiles, comprising a pneumatic cylinder and piston with its rod, one anchored and the other connected with the clutch lever, the piston rod extending from both ends of the cylinder, a disk valve at each end of the cylinder, through which the piston rod extends, seats for said valves facing in like directions, and air passages for each end of the cylinder outwardly of the valve seats.

3. A dash pot attachment for clutch levers of automobiles, comprising a cylinder, a piston fitting said cylinder and having a rod extending from each end of the cylinder, said cylinder and piston being constructed to provide a by-pass leak, a removable head for each end of the cylinder having a piston rod opening and freely open air ports, a disk valve at each end of the cylinder, one of said valves seating upon the cylinder end and the other upon the adjacent cylinder head, and both seating by movement in the same direction, means for anchoring the cylinder, and means for securing the piston rod to the clutch actuating lever.

Signed at Seattle, King County, Washington, this 29th day of April, 1927.

FREDERICK K. WARD.